(12) United States Patent
Sen

(10) Patent No.: US 7,065,041 B2
(45) Date of Patent: Jun. 20, 2006

(54) METHOD FOR RESILIENT CALL SETUP THROUGH ATM NETWORKS FOR SOFTSWITCH APPLICATIONS

(75) Inventor: Ercan Sen, Lake Worth, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 864 days.

(21) Appl. No.: 10/029,449

(22) Filed: Dec. 14, 2001

(65) Prior Publication Data

US 2003/0112761 A1 Jun. 19, 2003

(51) Int. Cl.
*G06F 11/00* (2006.01)
*H04L 12/56* (2006.01)

(52) U.S. Cl. .................. 370/227; 370/395.1; 370/401; 370/228

(58) Field of Classification Search ................ 370/216, 370/338, 350, 389–397, 400–409, 463–467, 370/352, 356, 905, 474, 225–228; 714/1, 714/2, 4
See application file for complete search history.

(56) References Cited

U.S. PATENT DOCUMENTS

| | | | | |
|---|---|---|---|---|
| 5,838,924 A | * | 11/1998 | Anderson et al. | 709/239 |
| 6,011,780 A | * | 1/2000 | Vaman et al. | 370/237 |
| 6,226,260 B1 | | 5/2001 | McDysan | 370/216 |
| 6,654,923 B1 | * | 11/2003 | Grenier et al. | 714/752 |
| 6,741,553 B1 | * | 5/2004 | Grenier | 370/218 |
| 6,813,241 B1 | * | 11/2004 | Wang et al. | 370/228 |
| 6,882,626 B1 | * | 4/2005 | Marathe et al. | 370/241.1 |

* cited by examiner

*Primary Examiner*—Chau Nguyen
*Assistant Examiner*—Venkatesh Haliyur

(57) ABSTRACT

A method establishes two redundant Switched Virtual Channel (SVC) connections through ATM Networks using the same ATM End System Address (AESA) from a source ATM End Point to a destination ATM End Point. The method provides end-to-end path protection without relying on any underlying resiliency features of an ATM Network so that the set-up model is transparent to the underlying ATM Network.

20 Claims, 4 Drawing Sheets

METHOD FOR RESILIENT CALL SETUP THROUGH ATM NETWORKS FOR SOFTSWITCH APPLICATIONS

BACKGROUND OF THE INVENTION

1. Field of the Invention

A method is described for establishing two redundant Switched Virtual Channel (SVC) connections through ATM Networks using the same ATM End System Address (AESA) from a source ATM End Point to a destination ATM End Point.

2. Description of Related Art

ATM (Asynchronous Transfer Mode) is a term typically used to describe a high-speed, cell-switching network for LANs and WANs that handles data in real-time voice and video. It generally combines the high efficiency of packet switching used in data networks, with the guaranteed bandwidth of circuit switching used in voice networks. ATM is widely used as a network backbone in large enterprises, communications carriers and Internet Service Providers (ISPs).

There are a number of relevant international and U.S. standards and recommendations for ATM networks, including the following:

ITU-T Recommendation I.630 (02/1999), "ATM Protection Switching";

ITU-T Recommendation Q.2931 (02/1995), "Broadband integrated Services Digital Network (B-ISDN)—Digital Subscriber Signaling System No. 2 (DSS2)—User-Network Interface (UNI) Layer 3 Specification for Basic Call/Connection Control";

ATM Form Standard AF-SIG-0061.000 (07/1996), "ATM UNI 4.0 Signaling Specification";

ATM Form Standard AF-UNI-0010.002 (09/1994), "ATM UNI 3.1 Signaling Specification"; and, ATM Form Standard AF-PNNI-0055.000 (09/1996), "ATM PNNI Specification Version 1.0".

In a typical data transmission system, information is transmitted over redundant connecting lines. It is critical, however, that such systems be robust so that the network experiences the minimum of downtime.

One approach is described in WIPO Publication WO 01/03360 entitled "Method for Switching Transmission Units to an Equivalent Circuit in a Packet or Unit Transmission" and assigned to Siemens Aktiengesellschaft. According to that invention, the priority information, which is allocated to each IP packet in the TOS field is used to route the relevant IP packet via either an active or the redundant connecting line. If a malfunction occurs, the transmission units are switched over to the redundant connecting line and high-priority IP packets take precedence over the IP packets with a lower priority.

Similarly WIPO Publication WO 98/04097 entitled "High Availability ATM Virtual Connections" describes a method of establishing and maintaining a connection through an asynchronous cell based network having a plurality of switching nodes such that when the source end point receives an indication that the destination end point has transferred to the alternate path, it sends cells from the source end point to the destination end point to complete the transfer to the alternate path.

Another approach is described in U.S. Pat. No. 6,226,260 entitled "Method and System For Resilient Frame Relay Network Interconnection" which describes, in part, a standard protocol which allows a network-to-network interface (NNI) to automatically respond to physical interface failures detected by the self-healing network.

While the foregoing prior art techniques address the question of improved resiliency in various types of data transport networks, nevertheless, some approaches require additional hardware and others are not optimally efficient for Voice over ATM (VoATM) applications based on Softswitch call model.

It was in the context of the foregoing needs that the present invention arose.

DESCRIPTION OF THE METHOD

Briefly described, the present invention comprises a method for establishing resilient paths through ATM networks for call establishment for Softswitch applications. Specifically, the method establishes two redundant SVC connections through ATM Networks using the same ATM End System Address (AESA) from a source ATM End Point to a destination ATM End Point. For the Softswitch application, the ATM End Point represent a pair of ATM Interfaces arranged in a 1:1 redundant configuration at Media Gateways. The method, however, described here is not restricted to Softswitch applications and can be applied to any ATM application and provides for end-to-end path protection without relying on any underlying resiliency features of an ATM network. In other words, the resilient call setup model is transparent to the underlying ATM network. Another important feature of the method is that it is also transparent to the call control plane of a Softswitch application. The Media Gateway Controllers controlling the call setup process are not aware of the resilient bearer path setup process between Ingress and Egress Media Gateways. Hence the method limits the implementation impacts only to Media Gateways, thereby leaving the rest of the entities involved in Softswitch applications, such as Media Gateway Controllers and other Servers, transparent to the method of setting resilient bearer paths through ATM networks. The method significantly minimizes the effort required to implement resilient path setup for Softswitch applications and eliminates the need for rerouting of calls upon detecting ATM network related failures.

The foregoing may be more fully understood by reference to the following drawings.

DETAILED DESCRIPTION OF THE PREFERRED EMBODIMENT

During the course of this description like numbers will be used to identify like elements according to the different views that illustrate the invention.

Figure 1:
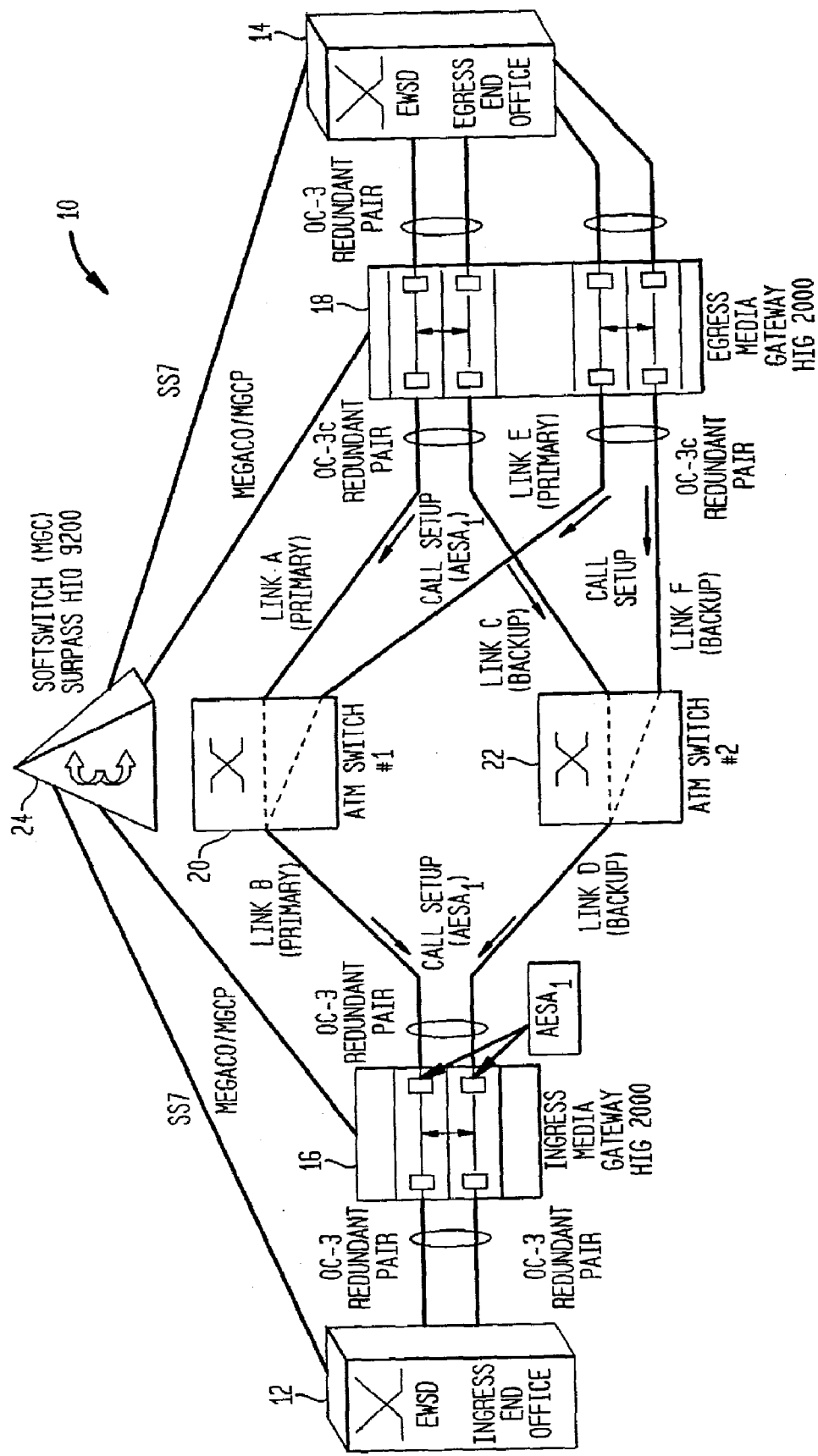
FIG. 1 illustrates an ATM Network during the initial resilient call set-up for a Softswitch Application.

A typical ATM (Asynchronous Transfer Mode) Network (10) is illustrated in FIG. 1 at the initial stage of resilient call set-up for a Softswitch Application. The ATM Network (10) includes an Ingress End Office (12), which communicates with an Egress End Office (14) at the opposite end of the system. A standard redundant Time Division Multiplexing (TDM) link pair connects the Ingress End Office (12) with the Ingress Media Gateway (16). Ingress Media Gateway (16) is connected by a primary link B to a first ATM switch (20) and by a backup link D to a second ATM switch (22). The Egress End Office (14) is connected by two redundant TDM link pairs to the Egress Media Gateway (18). Egress Media Gateway (18) is connected to the first ATM switch (20) by primary link A and primary link E and to the second ATM switch (22) by backup link C and backup link F. The process for setting up calls through the ATM network (10) is controlled by a Softswitch (Media Gateway Controller, MGC) (24).

The Ingress (16) and Egress (18) Media Gateways ATM Links to the ATM network are arranged in a 1:1 redundant configuration represented as a single AESA ($AESA_1$) as shown in FIG. 1. It is assumed that each redundant pair connection between Ingress (16) and Egress (18) Media Gateways follow a diverse route through the underlying ATM Network (10), i.e. redundant bearer path connections follow mutually exclusive paths and do not go through the same ATM Node to maintain resiliency against an ATM node failure in the ATM Network. In this method, the diverse routing for a redundant path relies on the network topology and routing configuration of the ATM Network.

The Egress Media Gateway (18) uses the same ATM End System Address ($AESA_1$) received from the Media Gateway Controller (24) for the Ingress Media Gateway (16) in the path setup request to setup a path through both its primary and backup links towards the Ingress Media Gateway (16).

The routing in the ATM network (10) should be arranged in such a way that a call setup (e.g. a switched virtual circuit—SVC) from the Egress Media Gateway (18) over the redundant link pair matches the corresponding redundant link pair in the Ingress Media Gateway (16). In other words, a call setup on a primary link (Link A) from the Egress Gateway (18) terminates at the primary link (Link B) defined by its AESA in the Ingress Media Gateway (16) and the corresponding backup call setup over the backup link (Link C) terminates at the corresponding backup link (Link D) using the same AESA in the Ingress Media Gateway (16) as shown in FIG. 1.

Figure 2:
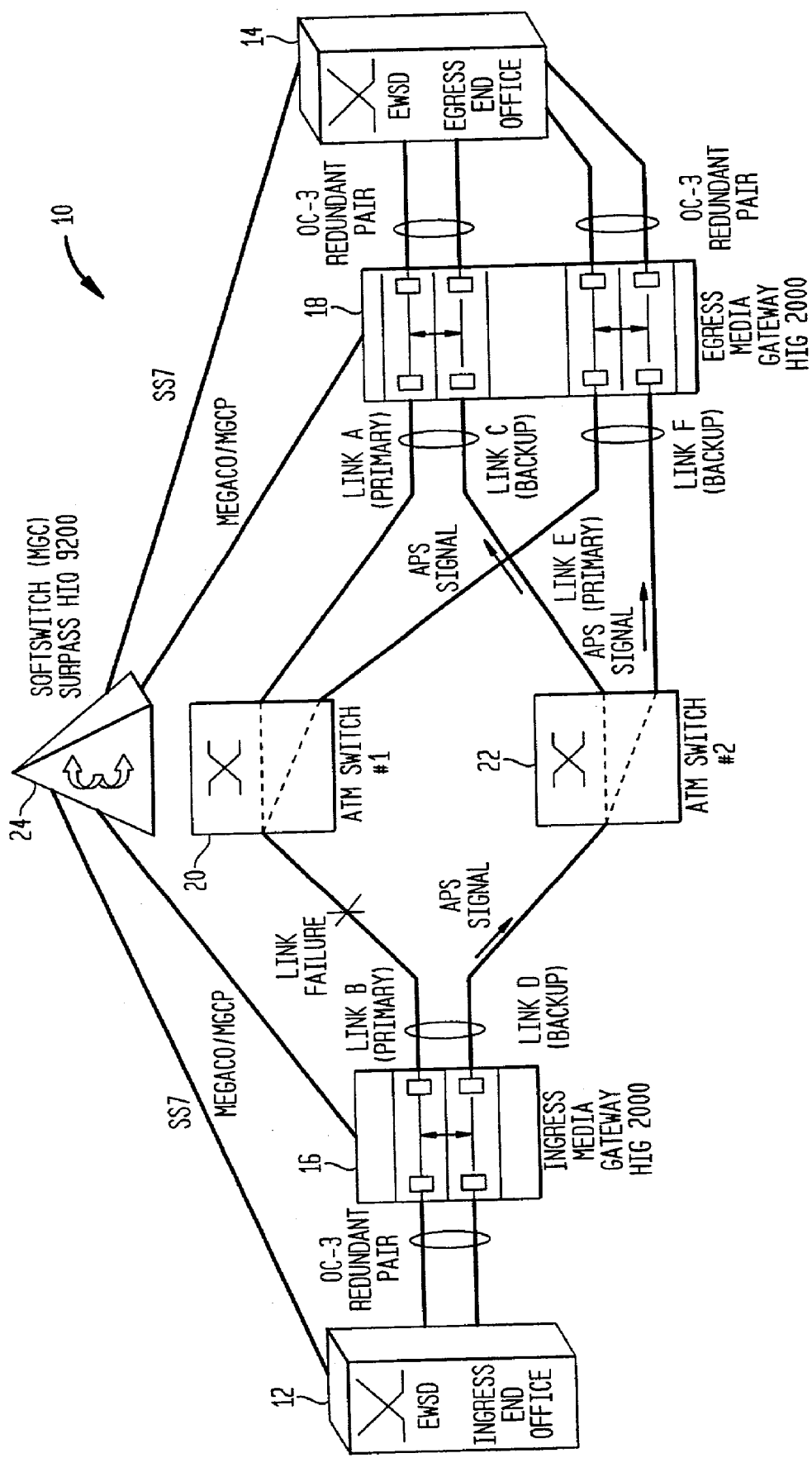
FIG. 2 illustrates how the automatic protection switching is accomplished for resilient paths.

In case of a primary link failure (Links A & B) due to an ATM node failure (ATM Switch #1 in FIG. 1) or an individual link failure (Link B in FIG. 1) on the ATM network (10) or the Media Gateway side, the call connections from the Ingress (16) and Egress (18) TDM end offices (12) are switched to the backup links at the Ingress (16) and Egress (18) Gateways triggered by the Automatic Protection Switching (APS) signaling between the Ingress (16) and Egress (18) Media Gateways as shown in FIG. 2. Notice that the APS signaling is between the Ingress (16) and Egress (18) Media Gateways and is transparent to the ATM Network (10).

Figure 3:
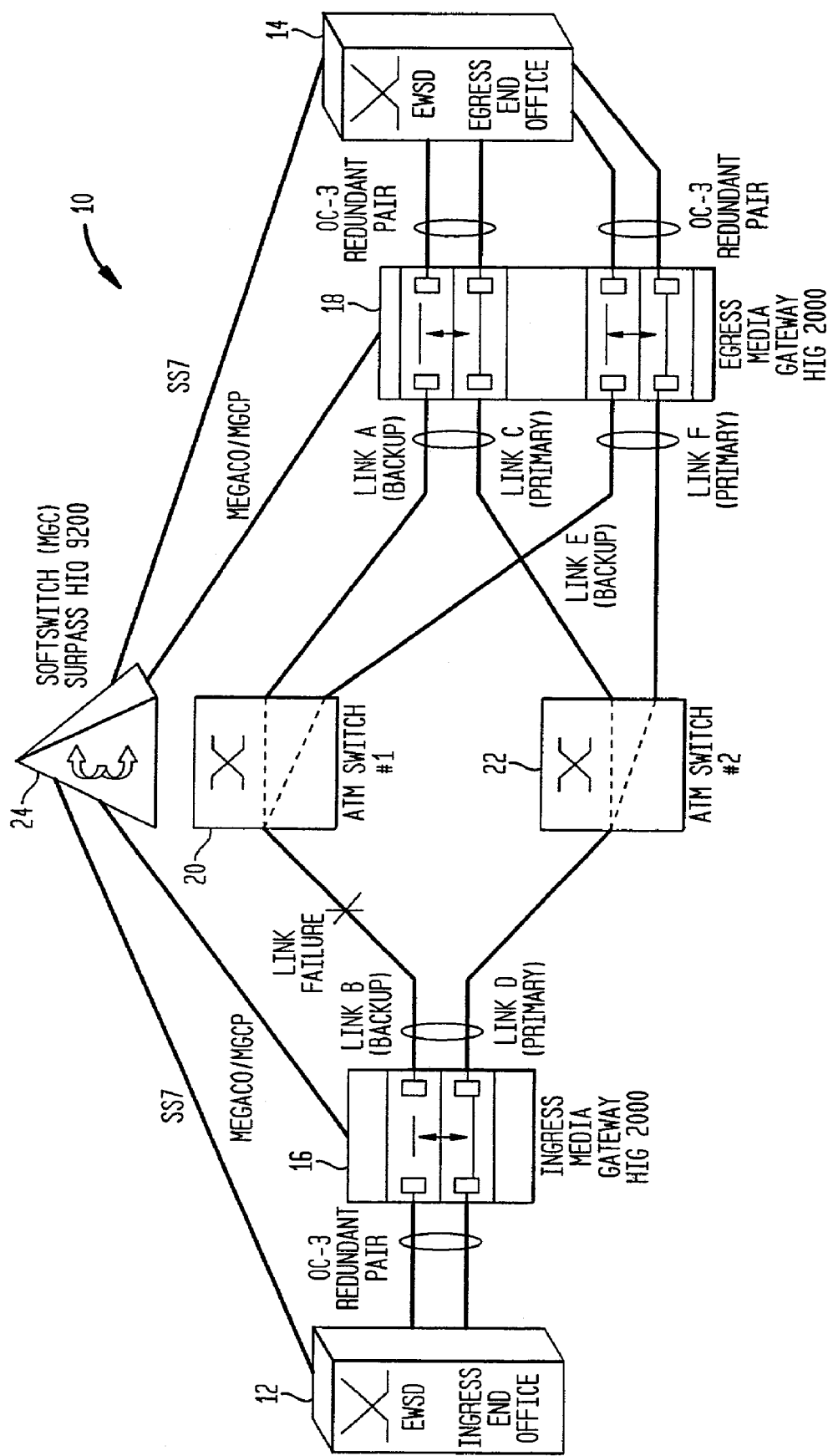
FIG. 3 illustrates the path configuration of the ATM Network after a switch-over.

The scope of APS signaling applies to the physical links connecting Media Gateways (16 and 18) to the ATM network (10). For example, if a Media Gateway (16 and 18) detects a link failure on one of its primary link (e.g. Link B in FIG. 1), it will initiate a switchover procedure to its corresponding backup link and will inform all the affected Virtual Channel Connections (VCCs) through its backup link using the APS signaling. At the other end of each affected VCC, the Media Gateways (16 and 18) receiving the APS signal through their backup links will automatically switch their affected VCCs from their primary links to their corresponding backup links as shown in FIG. 3.

Figure 4:
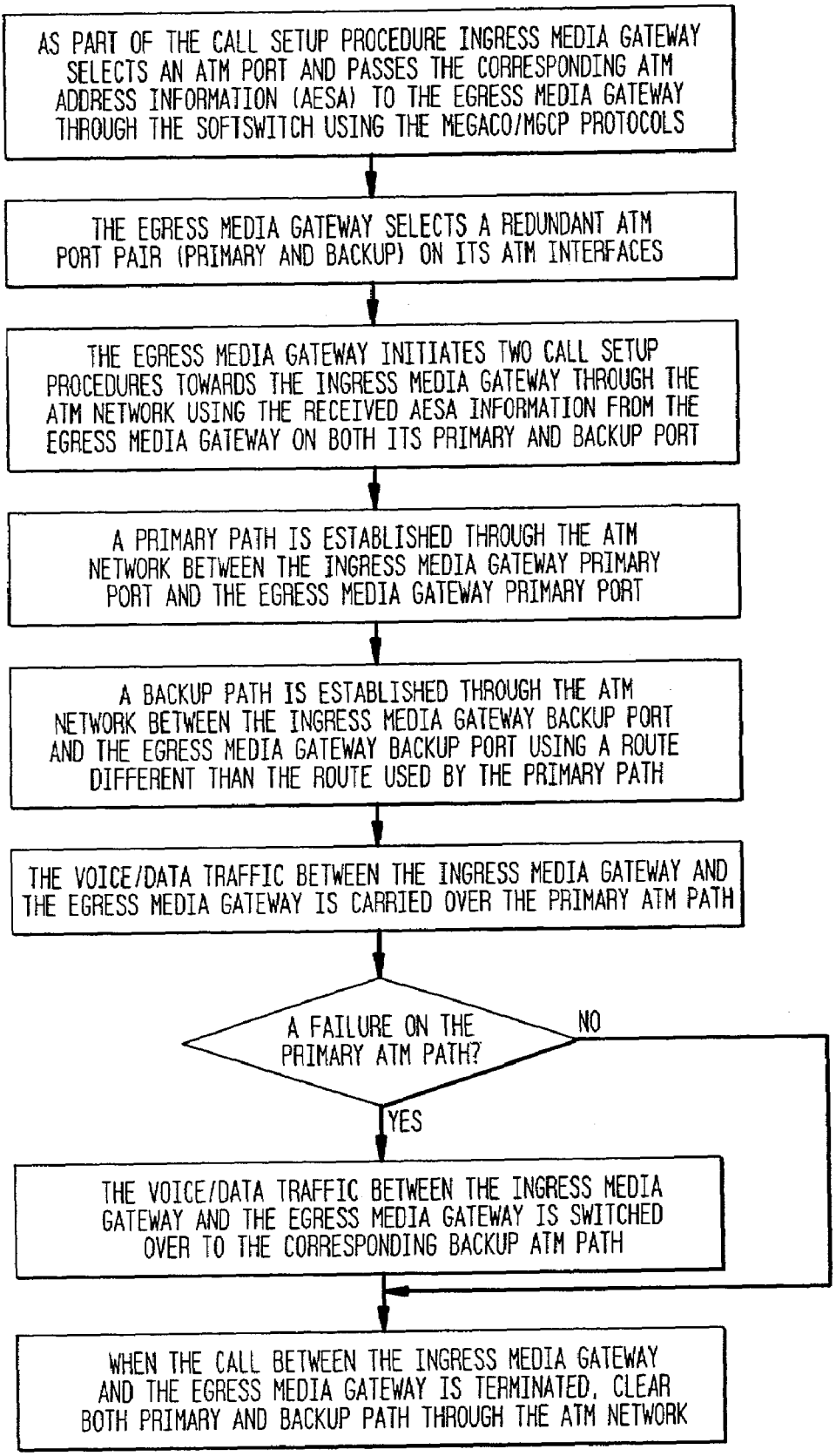
FIG. 4 is a flow diagram further illustrating the method steps of the invention shown in FIGS. 1–3.

The steps of the foregoing method are illustrated in a summary fashion in FIG. 4.

While the invention has been described with reference to the preferred embodiment thereof, it would be appreciated by those skilled in the art that changes can be made to the steps in the method without departing from the spirit and scope of the invention as a whole.

What is claimed is:

1. A method for establishing resilient paths through an asynchronous transfer mode (ATM) network including at least an ingress media gateway, an egress media gateway, a first ATM switch, a second ATM switch, a link A connecting said egress media gateway to said first ATM switch, a link B connecting said first ATM switch to said ingress media gateway, a link C connecting said egress media gateway to said second ATM switch, a link D connecting said second ATM switch to said ingress media gateway, said method comprising:

a. setting up a primary Switched Virtual Channel (SVC) connection from said egress media gateway to said ingress media gateway by using a specified ATM end system address (AESA) of a port on said ingress media gateway over said link A; and, b. setting up a backup SVC connection using the specified AESA from said egress media gateway to said ingress media gateway over said link C, wherein at least one primary SVC connection and one backup SVC connection are established between said egress media gateway and said ingress media gateway over different routes for a same call between an egress end office and an ingress end office.

2. The method of claim 1 further comprising:

c. detecting a failure in said primary SVC connection; and, d. switching a call connection between said egress end office and said ingress end office from said primary SVC connection to said backup SVC connection, whereby if there is a failure in said primary SVC connection, the call connection between said egress and ingress end offices is switched to said backup SVC connection by an Automatic Protection Switching (APS) signal in a manner that is not dependent on a physical configuration of said ATM network and by using end-to-end supervision of a call connection path.

3. The method of claim 2 further comprising:

e. informing all affected SVCs of a failure status of said primary SVC connection through the backup SVC connection using said APS signal.

4. The method of claim 3 wherein said detecting step c. further comprises:

f. detecting an ATM switch failure.

5. The method of claim 3 wherein said detecting step c. further comprises:

g. detecting a media gateway failure.

6. A method comprising:

at a softswitch connected to an ingress end office, an ingress media gateway, an egress media gateway, and an egress end office:

causing a primary SVC connection to use a specified ATM end system address (AESA) at a first port on said ingress media gateway over a first set of links, said primary SVC connection between said egress media gateway and said ingress media gateway; and causing a backup SVC connection to use said specified AESA at a second port on said ingress media gateway over a second set of links, said backup SVC connection between said egress media gateway and said ingress media gateway.

7. The method of claim 6, further comprising:
receiving a signal from said ingress end office requesting a setup of said primary SVC connection.

8. The method of claim 6, further comprising:
receiving an SS7 signal from said ingress end office requesting a setup of said primary SVC connection.

9. The method of claim 6, further comprising:
sending a signal to said ingress media gateway regarding a setup of said primary SVC connection.

10. The method of claim 6, further comprising:
sending a MEGACO/MGCP signal to said ingress media gateway regarding a setup of said primary SVC connection.

11. The method of claim 6, further comprising:
sending a signal to said egress media gateway regarding a setup of said primary SVC connection.

12. The method of claim 6, further comprising:
sending a MEGACO/MGCP signal to said egress media gateway regarding a setup of said primary SVC connection.

13. The method of claim 6, further comprising:
sending a signal to said egress end office regarding a setup of said primary SVC connection.

14. The method of claim 6, wherein said primary SVC connection is adapted for use by a Voice over ATM application.

15. The method of claim 6, further comprising:
receiving a notification of a detected link failure in said first set of links.

16. The method of claim 6, further comprising:
responsive to a notification of a detected link failure, switching to said backup SVC connection.

17. The method of claim 6, wherein said first set of links comprises no common links with said second set of links.

18. The method of claim 6, further comprising:
sending a signal informing all affected Virtual Channel Connections (VOCs) of a detected failure.

19. The method of claim 6, further comprising:
sending a signal informing all affected Virtual Channel Connections (VCCs) of a detected failure via Automatic Protection Switching (APS) signaling.

20. A method comprising:
at a softswitch connected to an ingress end office, an ingress media gateway, an egress media gateway, and an egress end office, said egress media gateway connected to said egress end office by two pairs of connections:
causing a primary SVC connection to use a specified ATM end system address (AESA) at a first port on said ingress media gateway over a first set of links, said primary SVC connection between said egress media gateway and said ingress media gateway, said first set of links comprising two primary links between a first ATM switch and said egress media gateway; and
causing a backup SVC connection to use said specified AESA at a second port on said ingress media gateway over a second set of links, said backup SVC connection between said egress media gateway and said ingress media gateway, said second set of links comprising two backup links between a second ATM switch and said egress media gateway.

* * * * *